US006585789B2

(12) United States Patent
Dippman et al.

(10) Patent No.: US 6,585,789 B2
(45) Date of Patent: Jul. 1, 2003

(54) DRY AIR FILTER FOR INTERNAL COMBUSTION ENGINES OF UTILITY VEHICLES

(75) Inventors: Siegfried Dippman, Lechbruck (DE); Lothar Kroneck, Marktoberdorf (DE); Gerd Rathke, Marktoberdorf (DE); Wolfgang Strodel, Fussen (DE)

(73) Assignee: Agco GmbH & Co, Marktoberdorf (DE)

( * ) Notice: Subject to any disclaimer, the term of this patent is extended or adjusted under 35 U.S.C. 154(b) by 7 days.

(21) Appl. No.: 10/044,841

(22) Filed: Jan. 11, 2002

(65) Prior Publication Data

US 2002/0148208 A1 Oct. 17, 2002

(30) Foreign Application Priority Data

Jan. 13, 2001 (GB) ............................................ 0100974

(51) Int. Cl.7 .......................... B01D 35/16; B01D 50/00
(52) U.S. Cl. ........................... 55/318; 55/385.3; 55/430
(58) Field of Search ....................... 55/318, 320, 385.3, 55/428, 430, 432

(56) References Cited

U.S. PATENT DOCUMENTS

| | | | | |
|---|---|---|---|---|
| 3,838,675 A | | 10/1974 | Schaeffer | |
| 3,884,658 A | | 5/1975 | Roach | |
| RE30,409 E | * | 9/1980 | Borsheim | 55/429 |
| 5,961,675 A | * | 10/1999 | Son et al. | 55/307 |
| 2002/0029792 A1 | * | 3/2002 | Carmi et al. | 134/21 |

* cited by examiner

*Primary Examiner*—Robert A. Hopkins

(57) ABSTRACT

In a dry air filter for internal combustion engines of utility vehicles having an outlet for the dust separated in a preliminary separator stage, compressed air is delivered to the outlet, at least intermittently, and in order to produce an ejector action to keep the outlet and optionally the dust discharge valve closing off the outlet free of dust, is blown in the direction of the dust discharge valve. Preferably, surplus compressed air already to hand from an on-board compressed air generating system is used for this purpose. In order to improve the cleaning action, the compressed air is delivered into the outlet via a nozzle.

15 Claims, 1 Drawing Sheet

DRY AIR FILTER FOR INTERNAL COMBUSTION ENGINES OF UTILITY VEHICLES

BACKGROUND OF THE INVENTION

The invention relates to a dry air filter for internal combustion engines of utility vehicles fitted with a system for generating compressed air, the dry air filter consisting of a filter housing containing a filter cartridge and preliminary dust-separator stage, which has an outlet with a discharge valve for the dust separated by the preliminary separator stage.

Dry air filters of the type described in U.S. Pat. No. 5,547,480, for example, are intended to deliver the requisite combustion air to the internal combustion engine as free as possibly from dust. To this end, any coarse impurities are firstly removed from the combustion air in the preliminary separator stage, after which fine dust is removed in the filter cartridge. The impurities arriving at a preliminary separator stage drop through an orifice in the housing wall at the end of this stage and into the outlet and are then either collected in a container or discharged to the open air via a dust discharge valve.

Dust discharge valves are described in HANDBUCH der MANN-FILTERTECHNIK, Section MANN-Trockenluftfilter, page 13. In specific situations (sudden high demand for power) due to the high vacuum pressure which then prevails, they prevent dust carried in the air from being sucked through the outlet. This air cannot be pre-treated by the preliminary separator stage or can be so only to an unsatisfactory degree, and this reduces the service life of the downstream filter cartridge intended for removing fine dust form the air.

Because of their structure, dust discharge valves are susceptible to clogging and are therefore not totally maintenance-free. The displacements of the discharge valve which occur due to the pulsing of the internal combustion engine during normal driving (rapid change in the vacuum pressure in the air filter) have a certain cleaning effect. However, they cannot prevent wet dust or larger harvest residues such as straw from sticking to the discharge valve and generally causing it to become blocked. As a result, it is necessary to clean the discharge valve manually from time to time. However, because the air filter is disposed under the engine bonnet, it is very difficult to assess, particularly in the case of large utility vehicles and cleaning of the discharge valve in due time often tends to be put off until there is a risk of the air filter becoming totally blocked. In addition, the system can also start to become clogged from the peripheral region of the opening in the filter housing, where coarse particles of dirt tend to adhere. In this case, cleaning the discharge valve manually will be of no help and the air filter has to be fully cleaned.

SUMMARY OF THE INVENTION

The objective of the invention is to design the air filter so that it will be easier to maintain this objective is achieved due to the fact that compressed air is delivered to the outlet, at least intermittently and, in order to produce an ejector action to keep the outlet and optionally the dust discharge valve closing off the outlet free of dust, is blown in the direction of the outlet of the dust discharge valve. As a result of the invention, the dust discharge valve is blasted with compressed air either continuously or at predetermined intervals, preventing a build-up of blockage in the outlet and the dust discharge valve. As a result, there is no need for separate, regular checks to ensure that the dust discharge valve is operating correctly and, as is the case, cleaning thereof. A system is already known in which an ejector effect is produced using the exhaust gases in the exhaust silencer of a motor vehicle and applied as a means of discharging dust. To this end, an exhaust silencer of this type (made by Eberspacher) has a terminal exhaust gas pipe, the inner end region of which is of a nozzle design in order to generate an under-pressure. In this region, the end of a long pipe projects into the dust to be removed. The dust is drawn out through the pipe due to the under-pressure and blown into the atmosphere with the exhaust gas. If the know system is rated to operate at full load, it works satisfactorily within this range. However, if the vehicle is operating at partial load or is idling, only a slight under-pressure is generated in the nozzle due to the small quantity of exhaust gas and there is a risk that the pipe carrying the dust will become blocked, in particular because of its length. If, on the other hand, the system is rated to operate at partial load, there is no risk of the pipe carrying the dust becoming blocked but when the system is operating at full load, a high counter-pressure builds up which significantly reduces the effective engine output. The invention provides a technically simple solution to the problem by delivering compressed air to the outlet and applying compressed air to the dust discharge valve, a line delivering the compressed air is run via a pressure-tight mounting through the wall of the outlet and has an end region facing the dust to discharge valve. In order to improve the ejector action, it has proved of practical use to deliver the compressed air to the outlet via a nozzle. In order to enhance the cleaning action of the blast of compressed air, it is also proposed that a nozzle be incorporated in the end region of the line and funnel-shaped hood, widening in the direction of the air flow, be provided, an annular gap being formed between it and the us outlet. For the same purpose, a nozzle may be provided immediately after the free end of the line, the flow direction of the compressed air leaving the line, the nozzle preferably comprising a venturi which acts to draw air and dust through the outlet.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
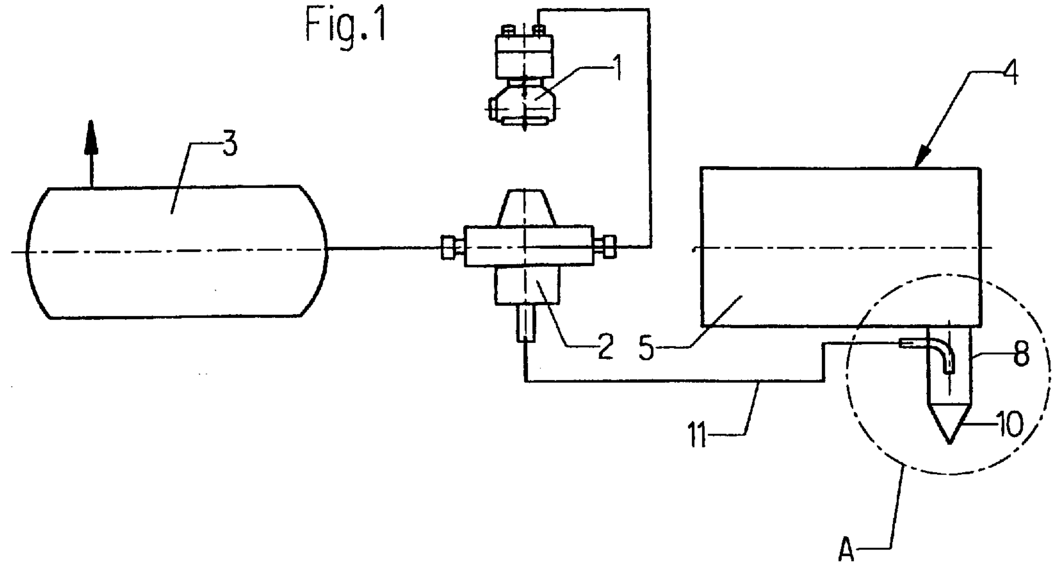
FIG. 1 is a schematic diagram of an air filter and a system for generating compressed air.

A utility vehicle, not illustrated in detail to retain clarity, is fitted, as illustrated in FIG. 1 with a system for generating and storing compressed air, needed to operate the air brake, for example. The system consists of a compressor 1, continuously driven by the drive motor of the vehicle, which supplies the generated compressed air via a pressure limiting valve 2 to a compressed air container 3, from which compressed air is drawn as required by the compressed air consumers, e.g., the brake. If the pressure in the compressed air container 3 exceeds a predetermined level, the pressure-limiting valve 2 blows the unneeded air away.

In order to clean the combustion air needed for the drive motor of the vehicle a dry air filter 4 is provided in a known manner, the filter housing 5 of which contains a preliminary dust-separator stage 6 and a filter cartridge 7 for fine-cleaning the combustion air. Adjacent to an inlet and outlet for the combustion air, not illustrated, the filter housing 5 has an outlet 8 for the dust separated in the preliminary separator stage 6. The dust arrives at the outlet 8 from a settling chamber 6*a* of the preliminary separator stage 6 via an orifice 9 in the filter housing 5. The outlet 8 is designed as a short pipe, to the free end of which a dust discharge valve 10 of a known type is connected. It consists of a funnel-shaped casing 10*a* made from a rubber-like material and has a slit-shaped orifice 10*b* on the bottom end, through which the dust escapes to the open air. The casing 10*a* of the dust discharge valve is designed so that the side walls lie one on top of the other closing off the slit 10*b* before the under-pressure in the interior of the outlet 8 becomes so high that air is sucked in to the air filter 4 from the atmosphere.

To ensure that the dust to be carried away is not able to block the peripheral region of the orifice 9 in the filter housing 5 and the interior of the dust discharge valve 10, the invention proposes that compressed air be delivered into the outlet 8. The compressed air used for this purpose may be drawn from the compressed air container 3 and may act continuously or only intermittently. For practical purposes and in the embodiment described as an example here, however, air that is not needed for filling the compressed air container 3 and that is blown out of the pressure-limiting valve 2 is delivered to the outlet. Since the pressure-limiting valve 2 will convey compressed air to the outlet 8 only if no other compressed air container is drawing air from the compressed air container 3, air is intermittently applied to the region in question, which advantageously imparts a cleaning action to the air intake.

Figure 2:
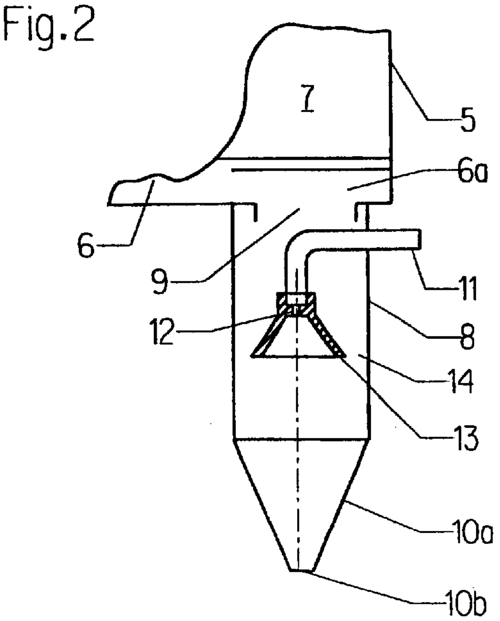
FIG. 2 shows detail A from FIG. 1 with a first solution for blowing the compressed air into the outlet.

The line 11 used to deliver the compressed air is run in a pressure tight mounting through the wall of the outlet 8 and bends into the interior so that the air flow flowing into the outlet 8 passes through the center thereof and is directed onto the dust discharge valve 10. In order to improve the ejector effect of the air flow, a nozzle 12 is provided on the end of the line 11, as illustrated in FIG. 2, which, in order to reduce the static air pressure, accelerates the air flow and blows it into a funnel-shaped hood 13, widening in the flow direction, mounted on the end region of the line 11. An annular gap 14 is left between the hood 13 and the outlet 8, by means of which, due to the low static pressure underneath the hood 13, dust is sucked out from the region to behind the orifice 9. Accordingly, no dust can become stuck anywhere in the outlet 8 and in the dust discharge valve 10. There is no need for any special features to enable cleaning of these regions.

Figure 3:
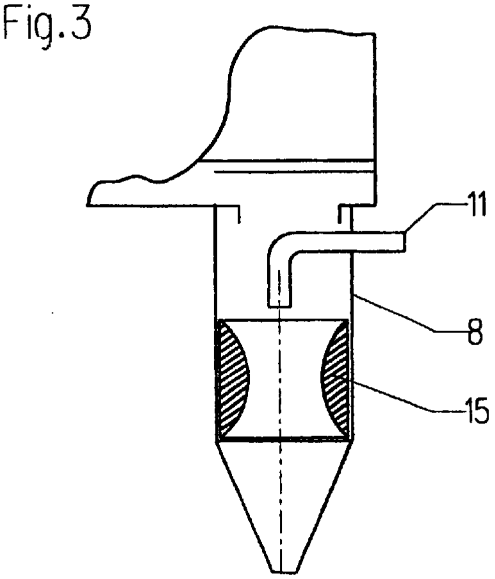
FIG. 3 depicts a second solution for blowing the compressed air into the outlet.

FIG. 3 illustrates a variant of the embodiment illustrated in FIG. 2. In this case, a nozzle 15 in the form of a venturi, is provided immediately after the free end of the line 11 as viewed in the flow direction of the compressed air leaving the line 11, the effect of which is to prevent the outlet 8 and the dust discharge valve 10 from becoming blocked.

A dry air filter is described, designed for internal combustion engines of utility vehicles fitted with a system for generating compressed air, the dry filter (4) consisting of a filter housing (5) containing a filter cartridge (7) and a preliminary dust separator stage (6), which has an outlet (8) for the dust separated by the preliminary separator stage.

In order to obviate the need for maintenance work on the air filter, compressed air is delivered to the outlet (8) at least intermittently, and, in order to produce an ejector action to keep the outlet and optionally the dust discharge valve (10) closing off the outlet free of dust, is blown in the direction of the dust discharge valve (10).

As a result of the invention, the dust discharge valve is blasted with compressed air so that no blockage can build up in the outlet and in the dust discharge valve. Accordingly there is no need to carry out separate, regular checks to ensure that the gas discharge valve is working correctly and, as in the case, to clean it.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A dry air filter for an internal combustion engine of a vehicle including a system for generating compressed air, the dry air filter comprising a filter housing containing a filter cartridge and a preliminary dust-separator stage having an outlet for the dust separated by the preliminary separator stage, and wherein compressed air is delivered to the outlet to clean the outlet of dust.

2. A dry air filter according to claim 1, wherein a dust discharge valve is attached to the outlet, and compressed air and dust exiting the outlet passes through the discharge valve, and wherein the said compressed air cleans the discharge valve of dust.

3. A dry air filter according to claim 2, wherein the discharge valve comprises a flexible and resilient member including an opening, which opening is biased into a closed position and is opened by the compressed air.

4. A dry air filter according to claim 1, wherein compressed air is delivered to the outlet by an air line.

5. A dry air filter according to claim 4, wherein the air line passes through a wall of the outlet.

6. A dry air filter according to claim 4, wherein an end region of the air line is disposed substantially in the center of the outlet.

7. A dry air filter according to claim 1, wherein the compressed air exiting the outlet passes through a nozzle downstream of the outlet valve.

8. A dry air filter according to claim 7, wherein a nozzle is provided in the end region of the line mounted with a funnel-shaped hood widening in the direction of the air flow, a gap being formed between the funnel-shaped hood and the outlet.

9. A dry air filter according to claim 4, wherein a nozzle is provided downstream of the end of the compressed air line.

10. A dry air filter according to claim 9, wherein the nozzle comprises a venturi.

11. A dry air filter according to claim 1, wherein compressed air is delivered to the outlet intermittently or continuously.

12. A dry air filter according to claim 1, wherein the system for generating compressed air comprises a compressor, an air tank and a pressure limiting valve.

13. A dry air filter according to claim 12, wherein the compressed air for delivery to the outlet is drawn directly from the air tank.

14. A dry air filter according to claim 12, wherein the compressed air for delivery to the outlet is drawn from the pressure limiting valve.

15. A dry air filter according to claim 1, wherein the compressed air system is the system which generates compressed air for other compressed air consumers on the vehicle.

* * * * *